(No Model.) 3 Sheets—Sheet 1.

W. C. JAMES.
COMBINED TRUCK AND WEIGHING SCALE.

No. 372,538. Patented Nov. 1, 1887.

Witnesses—
Hinkley Hyde.
Gertrude M. Day.

Inventor—
Willard C. James,
By Albert M. Moore,
His Attorney.

(No Model.) 3 Sheets—Sheet 2.
W. C. JAMES.
COMBINED TRUCK AND WEIGHING SCALE.
No. 372,538. Patented Nov. 1, 1887.
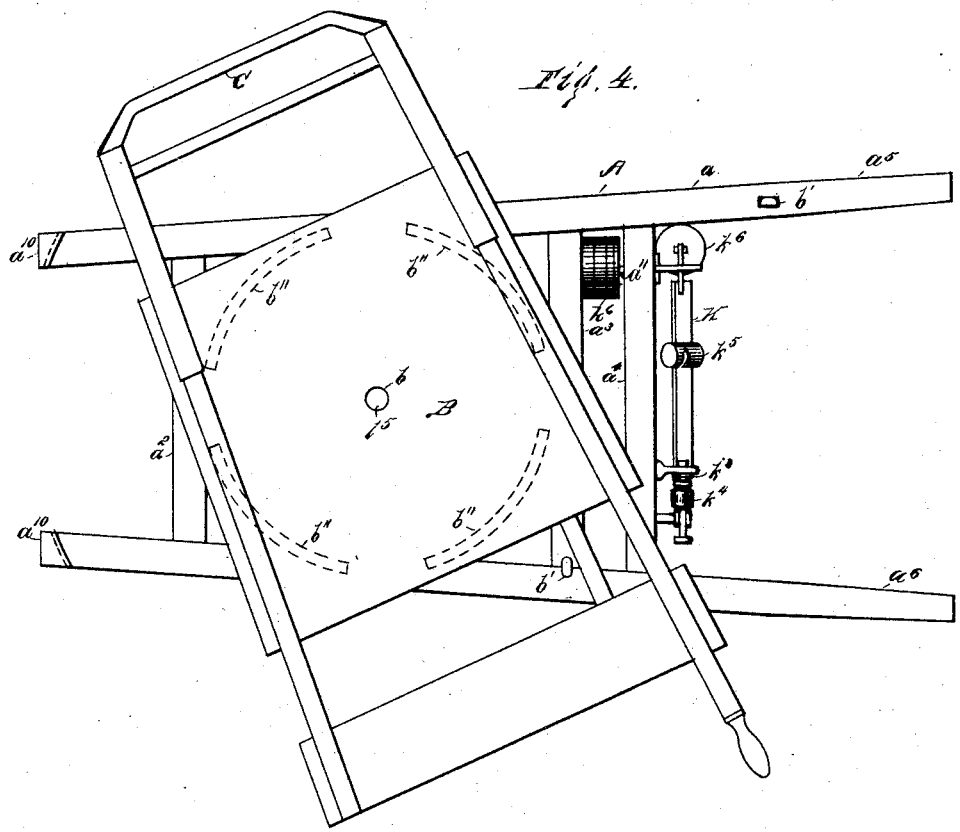
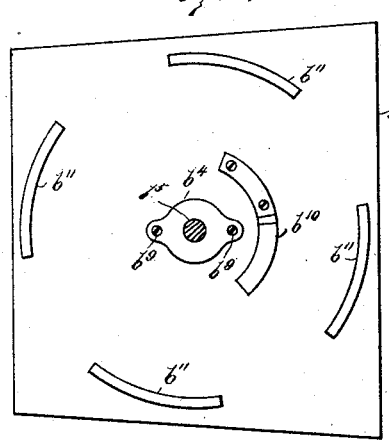
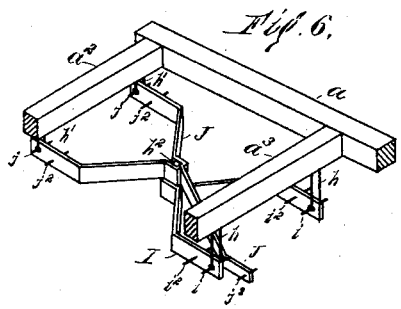
Witnesses —
Hirkley Hyde,
Gertrude M. Day.
Inventor —
Willard C. James,
By Albert W. Moore,
His Attorney.

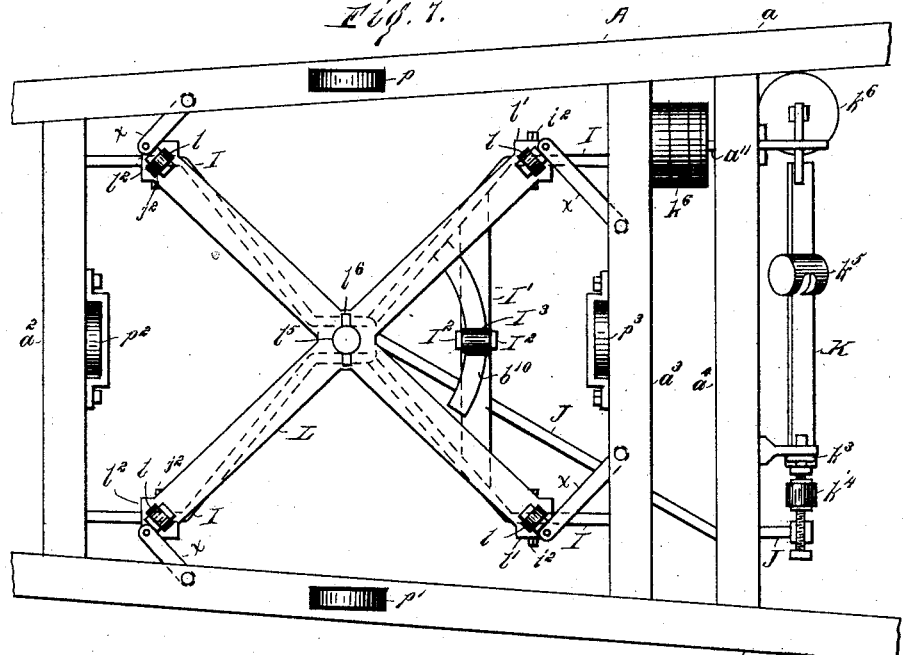

UNITED STATES PATENT OFFICE.

WILLARD C. JAMES, OF BOSTON, MASSACHUSETTS.

COMBINED TRUCK AND WEIGHING-SCALE.

SPECIFICATION forming part of Letters Patent No. 372,538, dated November 1, 1887.

Application filed July 1, 1886. Serial No. 206,800. (No model.)

*To all whom it may concern:*

Be it known that I, WILLARD C. JAMES, a citizen of the United States, residing at Boston, in the county of Suffolk and Commonwealth of Massachusetts, have invented a certain new and useful Improvement in Combined Trucks and Scales, of which the following is a specification.

My invention relates to combined hand-trucks and scales; and it consists in the devices and combinations hereinafter described and claimed, the general objects of my improvement being to hold the platform rigidly upon the frame and the knife-edges of the weighing apparatus out of contact when the truck is used merely for moving a load, to raise the platform off from the frame and to bring said knife-edges in contact with their bearings readily when it is desired to weigh the load, and to protect the scale-beam and the weights when the apparatus is not used for weighing.

Figure 1:
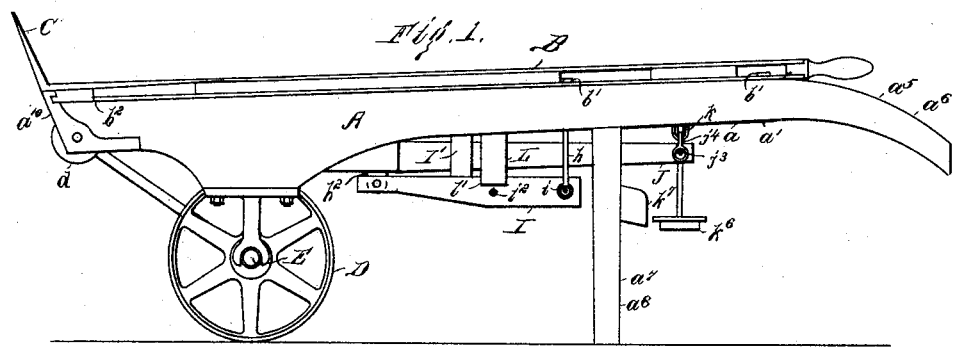
Figure 2:
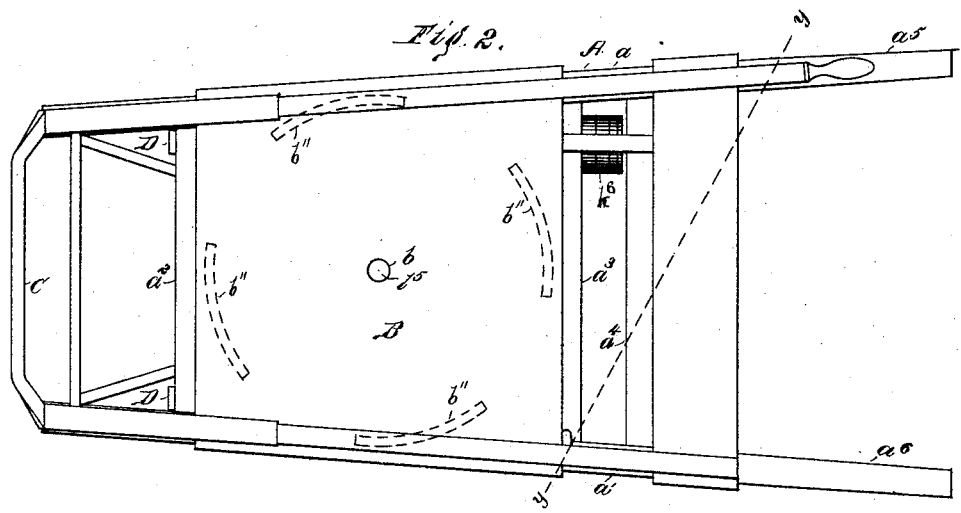
Figure 3:
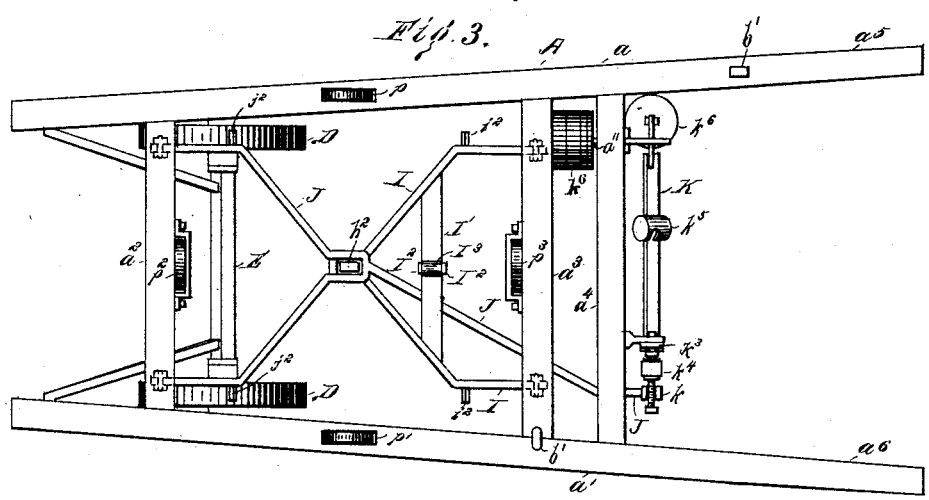

In the accompanying drawings, on three sheets, Figure 1 is a side elevation of my improved combined hand-truck and scale; Fig. 2, a plan of the same with the platform in position for carrying a load; Fig. 3, a plan of the same, the platform being omitted to show the weighing mechanism, the check-links and the X-shaped lever being also omitted; Fig. 4, a plan of the same, with the platform turned into position for weighing; Fig. 5, a reversed plan of the middle part of the platform; Fig. 6, an isometric view of a part of the frame, the weighing-levers, and their supporting-loops; Fig. 7, a plan of part of the truck, showing the scale-beam, the X-shaped lever, the anti-friction wheels journaled on the same, which support the platform in the operation of weighing, the anti-friction wheels on the truck, on which the platform turns, the cam which raises the lower weighing-levers, said last-named levers, (shown partly in dotted lines,) and the check-links; Fig. 8, a rear elevation of the weighing-levers out of position for weighing and of the cam which raises said levers, showing also the side rails of the truck in cross-section on a plane passing through the pivot on which the platform turns; Fig. 9, a rear elevation showing part of the platform in section on the line $y\ y$ in Fig. 2, and showing also the scale-beam, parts of the weighing-levers, and the cup or pocket which receives the counterpoise when the weighing apparatus is not in use, the platform being turned out of position for weighing; Fig. 10, an isometric view of the cam which raises the X-shaped lever and of the spindle on which the platform turns.

The frame A of the truck consists of two side rails, $a\ a'$, connected by cross girts or ties $a^2\ a^3\ a^4$. The rear ends of the side rails are suitably shaped to form handles $a^5\ a^6$, and in the front end of said side rails are journaled small wheels $d$, used in loading the truck by shoving the toe-piece or lifting-piece under the load, the load being supported during transportation upon a larger pair of wheels, D, placed in the rear of the small wheels $d$. The frame is also provided with suitable legs, $a^7\ a^8$, for the usual purpose of supporting the truck by the aid of the large wheels D in a nearly horizontal position.

To avoid the necessity of raising the large wheels D from the floor in the act of loading the truck, the axle E of said truck is adapted to swing about the small wheels $d$ or about the front end of the truck-frame, as fully explained in another application, No. 193,971, filed March 4, 1886, this feature not being claimed in the present application.

The platform B is not rigidly secured to the frame, but serves as a weighing table or platform of the scale and rests upon the frame while transporting a load, or rather upon four anti-friction wheels, P P' P² P³, journaled on the frame, which enables the platform to be more easily turned into the position it occupies while the load is being weighed, as will be explained. The toe-piece C is secured to the platform B instead of to the frame, in order that it may not sustain any part of the load placed upon the platform and prevent the full weight of the load being indicated by the scale.

From the cross-ties $a^2\ a^3$ hang loops $h\ h'$, (see Fig. 9,) arranged in two pairs, and in these loops are supported knife-edges $i\ j$, which project from the sides of the weighing-levers I J, respectively. These levers I J are of substantially the same form as are commonly used in platform-scales, the lever I being V-shaped and its knife-edges being supported in the loops $h$, and the lever J being Y-shaped and its knife-edges being supported in the loops $h'$. The lever J is connected to the lever I by a link, $h^2$, beneath the center of the platform, in the usual manner of platform-scales. The platform B is not supported directly upon the weighing-levers I J in the operation of weighing, but rests upon anti-friction rolls $l$, (see Figs. 7 and 8,) one of which rolls is journaled upon each arm of a four-armed or X-shaped lever or stand, L, the journals of said last-named anti-friction rolls being radial to the center of said lever L. The outer ends $l'\ l^2$ of the X-shaped lever L are bent downward and notched on their under surfaces at $l^3\ l^4$, to receive knife-edges $i^2\ j^2$, which project from the sides of the levers I J, respectively, nearer to the center of the lever L than the knife-edges $i'\ j'$.

A vertical stud, $l^5$, projects upward from the lever L at the junction of its arms, and the platform B is provided with an opening, $b$, to receive said vertical stud. When the truck is being used simply as a truck, the platform is held in place over the frame A by the front ends of the straps $b^2$, secured to the under side of the platform B and uniting the parts of said platform, entering horizontal notches in blocks $a^{10}$, which serve as journal-boxes for the small wheels $d$, and which project slightly above the front ends of the side rails, as shown in Fig. 1, and is also held in place by said straps $b^2$, running under the heads or hooks of the hooked studs $b'$, one of which hooks is secured to each of the side rails, $a\ a'$, as shown in Figs. 1, 3, 4, and 9. The rear end of the Y-shaped lever J is connected, by knife-edges $j^3$, projecting therefrom, and loops $j^4\ k$, to the scale-beam K, the latter having knife-edges $k'$, which engage said loop $k$, as shown in Fig. 9. The scale-beam K is provided with other knife-edges, $k^2$, which serve as a fulcrum therefor, the last-named knife-edges being supported by a link, $k^3$, which hangs from the rear cross-girt, $a^4$. The scale-beam K is graduated in the usual manner, and is provided with a balance-ball, $k^4$, a sliding poise or weight, $k^5$, and a counterpoise, $k^6$, which also serves as a weight-receiver to hold additional notched weights of the usual construction. The notched weights $k^6$, when not in use, are supported upon a rod, $a^{11}$, which extends between the cross-girts $a^3\ a^4$, the ends of said rod entering said cross-girt and being supported thereby. The counterpoise, when the weighing apparatus is not in use, rests in a holder or cup, $k^7$, (shown in Fig. 9,) secured to the leg $a^7$ of the frame. The scale is substantially of the ordinary construction and operation.

When the weighing apparatus is not in use, the knife-edges of the same are held out of contact with their bearing-surfaces, to prevent their being worn by being jolted about when the truck is in motion. A pin, $l^6$, is driven horizontally through the vertical stud $l^5$ and its ends project therefrom. A cam-plate, $b^4$, (shown in Fig. 10,) is provided with a central hole large enough to allow said stud $l^5$ to turn freely therein, and is provided on opposite sides of said hole with cams or inclines $b^7$, the inclinations of which are in opposite directions, and which, when the platform is turned about the stud $l^5$ out of its weighing position, run under the ends of the pin $l^6$ and lift the ends of the X-shaped lever L out of contact with the knife-edges $i^2\ j^2$ of the weighing-levers, the ends of said pin resting upon the flat upper surfaces, $b^8$, of the inclines $b^7$ when the platform is turned into the position shown in Figs. 1 and 2, said cam-plate being secured to the platform, as shown in Fig. 5, by screws $b^9$, passing through its ends into the under side of said platform. Another incline or cam, $b^{10}$, is secured to the under side of the platform, and is of the shape shown in Figs. 6, 7, and 8, being curved concentrically with the inclines $b^7$ and having a more gradual inclination on its upper surface than the inclines $b^7$.

A strap, I', is secured to the arms of the V-shaped lever I, and is bent upward between its ends, as shown in Figs. 8 and 9, and is provided at its highest part with upwardly-projecting ears $I^2$, between which is journaled an anti-friction wheel, $I^3$. When the platform is turned out of position for weighing, the cam $b^{10}$ runs under the anti-friction wheel $I^3$ and raises the lever I off from its bearings, lifting it against the lever J, and thereby raising the lever J off from its bearings, but not raising the last-named levers sufficiently to bring them into contact with the X-shaped lever L. When the platform is turned into the position for weighing, (shown in Fig. 4,) the cams $b^7\ b^{10}$ allow the levers I J L to take their proper bearings. Lifting the weighing-levers off from their bearings prevents them from being worn by the jolting of the truck when used merely as a truck.

To the under side of the platform B are secured four arc-shaped tracks, $b^{11}$, concentric with the cams $b^7\ b^{10}$, these tracks $b^{11}$ being at equal distances from the center of the cam-plate $b^4$, and each of them occupying about one-eighth of a circle, as shown in Fig. 5 and by dotted lines in Figs. 2 and 4. The tracks $b^{11}$ rest upon the anti-friction rolls P P' $P^2\ P^3$ (shown in Figs. 3, 7, and 8) when the platform is in the position shown in Fig. 1, and upon the anti-friction rolls $l$ when in the position shown in Fig. 4, but do not rest, when in either position, upon both sets of anti-friction rolls. Check-links $x$, Figs. 7 and 8, connect the frame and the X-shaped lever L for the usual purpose of steadying the lever L and of preventing the lever L from turning when the platform turns, the ends of the lever L being provided with vertical studs, which pass upward through holes in the inner ends of said check-links, said holes being large enough to allow the links to move freely on said studs. The scale-beam is inclined, as shown in Figs. 3, 4, and 7, to allow it to be read without stooping.

Obviously, instead of a single sectional track and two sets of anti-friction rolls, as above described, a single set of anti-friction rolls might be journaled to the under side of the platform, adapted to stand upon the frame when the platform is in its normal position, and to stand upon the X-shaped lever L when the platform is turned into position for weighing.

I claim as my invention—

1. The combination of the truck-frame, weighing-levers supported upon said frame, and a suitable platform normally supported upon said frame and adapted to be turned laterally to bring said platform out of contact with said frame to rest upon said weighing-levers, as and for the purpose specified.

2. The combination of a suitable frame, weighing-levers provided with knife-edges and supported by said frame, and a platform supported upon said frame and adapted to be moved in one direction to bring said platform out of contact with said frame to rest upon said weighing-levers and to be moved in the other direction to rest upon said frame and to lift said knife-edges from their bearing-surfaces, as and for the purpose specified.

3. The combination of a suitable frame, weighing-levers supported from said frame, and weight-indicating devices supported on said frame below the top of the same, a suitable platform normally resting upon said frame parallel therewith and covering and concealing said indicating devices, and adapted to be turned at an angle to said frame laterally to expose to view said indicating devices and to cause said platform to rest upon said weighing-levers and out of contact with said frame, as and for the purpose specified.

4. The combination of a suitable frame, weighing-levers supported from said frame and provided with knife-edges, a four-armed lever resting upon said knife-edges, anti-friction rolls journaled on the arms of said four-armed lever above the same, and a platform normally resting upon said frame and provided with sectional tracks adapted, when said platform is turned laterally, to rest upon said anti-friction rolls and to be out of contact with said frame, as and for the purpose specified.

5. The combination of a suitable frame, weighing-levers provided with knife-edges and suitably supported from said frame, a strap secured to the lower one of said levers, the platform turning on a center, and an incline or cam secured to the under side of said platform and curved concentrically with said center, and adapted, when said platform is turned parallel with said frame, to engage said strap and to raise said weighing-levers and their knife-edges out of contact with their bearing-surfaces, as and for the purpose specified.

6. The combination of a suitable frame, weighing-levers provided with knife edges and suitably supported from said frame, a strap secured to the lower one of said levers, an anti-friction roll journaled on said strap, the platform turning on a center, and an incline or cam secured to the under side of said platform and curved concentrically with said center, and adapted, when said platform is turned parallel with said frame, to run under said anti-friction roll and to raise said strap and weighing-levers and to lift said knife-edges out of contact with their bearing-surfaces, as and for the purpose specified.

7. The combination of a suitable frame, weighing-levers supported from said frame, a four-armed lever supported upon knife-edges with which said weighing-levers are provided, a vertical stud secured to the top of said four-armed lever, at the center thereof, a platform normally resting upon said frame parallel therewith and having an opening to receive said vertical stud, a cam-plate having a central opening to receive said stud and provided on its upper surface with inclines or cams, and a pin driven horizontally through said vertical stud above said cam-plate, whereby, when said platform is turned laterally at an angle to said frame, said four-armed lever is allowed to rest upon said knife-edges, and whereby said four-armed lever is raised out of contact with said knife edges when said platform is parallel with said frame, as and for the purposes specified.

8. The combination of a suitable frame, weighing-levers provided with knife-edges suitably supported from said frame, the lower one of said levers being provided with a strap, a four-armed lever adapted to rest upon other knife-edges with which said weighing-levers are provided and having a vertical stud projecting from the top thereof near the center of the same, the platform, a cam-plate secured to said platform and having a central opening to receive said stud and provided on its upper surface with inclines or cams, a pin driven horizontally through said stud above said inclines, and another incline or cam secured to the under side of said platform and curved concentrically with the opening in said cam-plate, and adapted to engage with said strap and to raise said weighing-levers off from their supports when said platform is turned parallel with said frame, said inclines on said cam-plate being adapted to raise said four-armed lever, when said platform is so turned, by running under said horizontal pin, and having a greater inclination than the cam which engages with said strap, whereby, when said platform is turned at an angle to said frame, all of said knife-edges are in contact with their bearing-surfaces, but out of contact with said surfaces when said platform is in its normal position parallel with said frame, as and for the purpose specified.

9. The combination of the truck-frame, anti-friction rolls journaled on said frame, weighing-levers and weight-indicating devices supported from said frame, other anti-friction rolls supported by said weighing-levers, a platform adapted to slide on said frame, and track-sections secured to the under side of said platform and normally supported upon said first-named anti-friction rolls, but adapted by the sliding of said platform to be moved off from said first-named rolls and onto said second-named rolls, as and for the purpose specified.

WILLARD C. JAMES.

Witnesses:
ALBERT M. MOORE,
GERTRUDE M. DAY.